Figure 1:
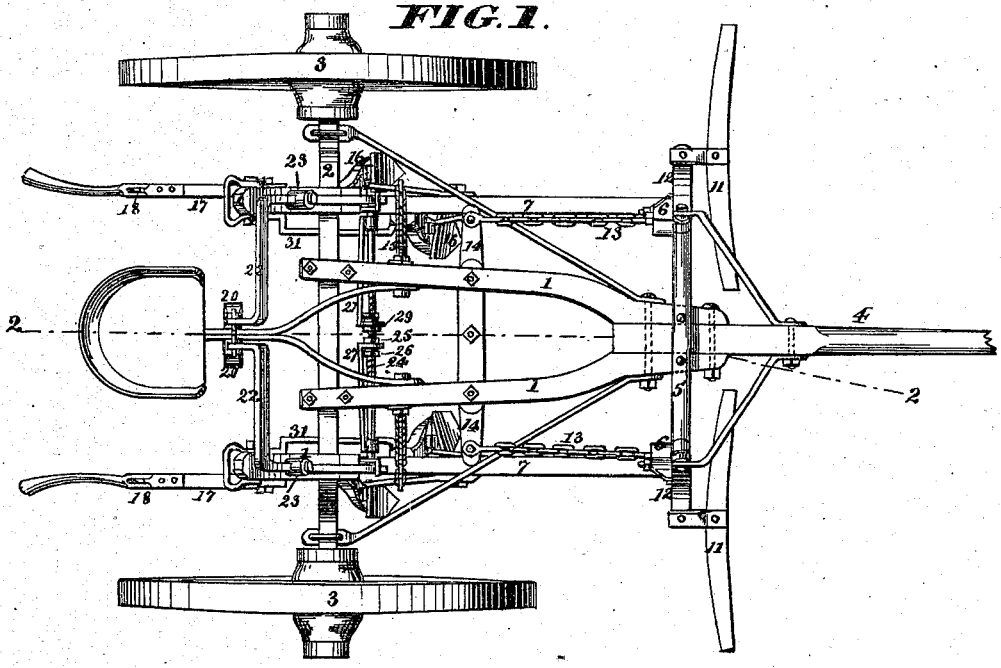

R. S. HIGGINS.
Cultivators.

No. 158,709.

2 Sheets--Sheet 1.

Patented Jan. 12, 1875.

WITNESSES
Jacob Scheitlin
Walter Allen

INVENTOR
Rosander S. Higgins
By Knight Bros. Attorneys

R. S. HIGGINS.
Cultivators.
No. 158,709.
2 Sheets--Sheet 2.
Patented Jan. 12, 1875.
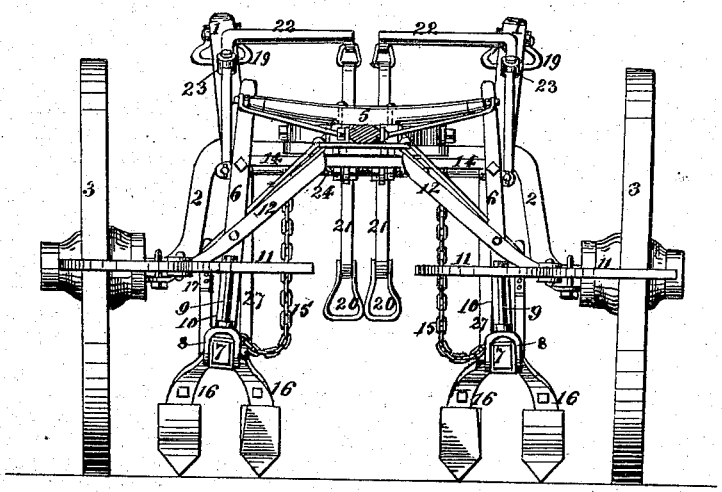
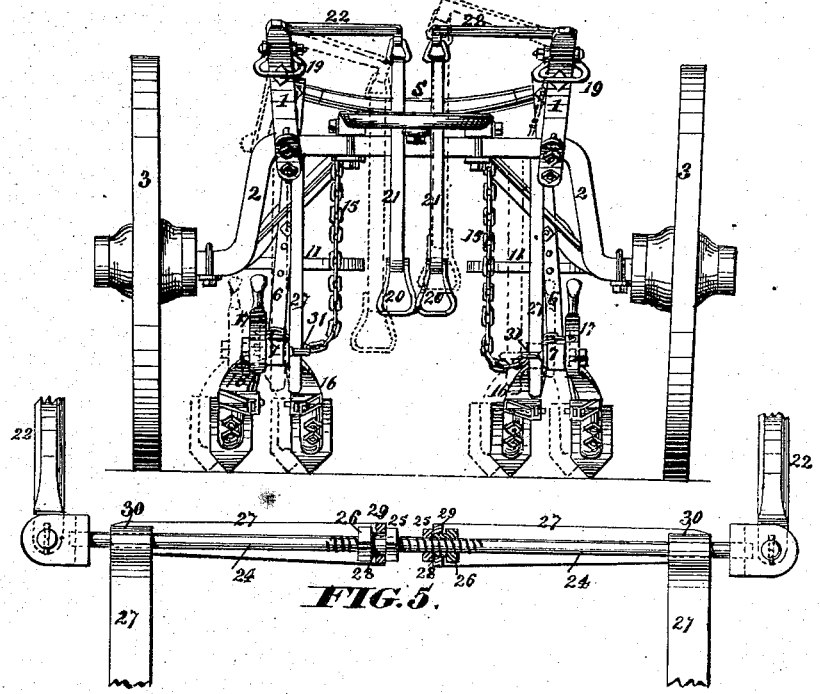
WITNESSES
Jacob Scheitlin
Walter Allen
INVENTOR
Rozander S. Higgins
By Knight Bros Attorneys

UNITED STATES PATENT OFFICE

ROZANDER S. HIGGINS, OF FAIRFIELD, ILLINOIS.

IMPROVEMENT IN CULTIVATORS.

Specification forming part of Letters Patent No. 158,709, dated January 12, 1875; application filed August 19, 1874.

*To all whom it may concern:*

Be it known that I, ROZANDER S. HIGGINS, of Fairfield, in the county of Wayne and State of Illinois, have invented certain new and useful Improvements in Cultivators, of which the following is a specification:

My invention principally relates to what are known as sulky-cultivators, in which the driver rides upon a seat, leaving his feet free for use in adjusting the position of the plows, or for other purposes.

My implement is made with a draft apparatus of novel construction, the single-tree of each horse being attached to the lower end of a brace extending downward obliquely from the front of the main frame, and bolted to a pendant, which it stays laterally, while permitting it to move freely forward and backward. These pendants are swiveled to a cross-bar upon said frame, and have the forward ends of the plow-beams pivoted to their lower ends by means of stemmed clevises, also of novel construction. The arrangement is such that each horse draws his own plow, and one-half of the frame or sulky. The lateral movement of the plows while in use is imparted by the feet of the driver, by means of stirrups suspended from the horizontal arms of bell-crank levers, the vertical arms of which are pivoted at their extremities to a transverse rod, to which are adjustably attached pendent L-shaped bars, the lower ends of which work in loops attached to the sides of the beams near their rear ends. This arrangement for controlling the lateral position of the plows enables the operator to bear downward with his feet in the direction in which the action can be performed with the least fatigue. The adjustment of the plows as to their width asunder is performed by means of paired nuts, working upon the transverse bar already referred to, and holding the L-shaped pendants upon the said bar, so as to hold the beams at any distance asunder to which they may be set, while permitting their free vertical play. In connection with each pair of nuts I employ a sleeve, which receives the eye of the L-shaped bar, in manner hereinafter described, so as to protect the screw-thread of the transverse bar from wear.

For supporting the plows out of their operative position, for the purpose of turning at the ends of rows, or in transporting the implement from place to place, I provide hooks upon the handles, which catch in pivoted bails upon the upper part of the frame, leaving the plow-beams with sufficient freedom to cause the draft to act the same upon the main frame as while the machine is at work.

Figure 2:
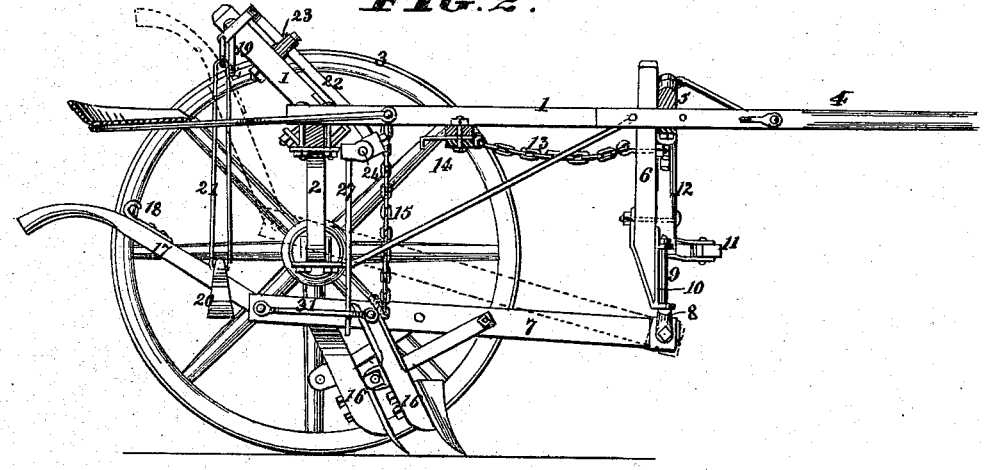

In the accompanying drawings, Figure 1 is a plan or top view of an implement illustrating my invention. Fig. 2 is a vertical section of the same on the broken line 2 2, Fig. 1. Fig. 3 is a front view of the implement. Fig. 4 is a rear view, the lateral movement of the plows by means of the stirrups and their attachments being illustrated by dotted lines. Fig. 5 is a front view, partly in section, on a larger scale, illustrating the mode of connecting and adjusting the L-shaped bars upon the horizontal supporting-bar, to which they are attached.

The main frame 1 is supported by a bent axle, 2, upon wheels 3 3, in customary manner. 4 represents the tongue of the implement, and 5 a transverse bar bolted to the top of the main frame at its forward part. To the extremities of this bar are swiveled pendants 6, which are pivoted to the forward ends of the plow-beams 7 through the medium of clevises 8, constructed with stems 9, swiveled to socket-plates 10 on the pendants 6; the horizontal pivot, by which the clevis is attached to the front of the plow-beam, affording to the plow free vertical motion, while the pivot-stem 9 in the socket-plate 10 affords equally free lateral movement to the plows, and the entire structure possesses the necessary strength for the purposes of draft. The single-trees 11 are attached to the lower extremities of the braces 12, extending obliquely downward and outward from the front of the main frame, to which they are hinged and bolted at or near their mid-length to the central parts of the pendants 6.

This device will be seen to allow a free longitudinal movement to the pendants, while bracing them laterally, and affords the medium by which the draft of each horse is communicated to his own plow. Stay-chains 13, stretched from the back of the pendants 6 to a double-tree, 14, which is bolted to the center of the main frame, communicate the draft to the frame or sulky. The rear ends of the plow-beams are suspended to the frame by chains 15. 16 represent plow standards and shares of common construction. 17 are handles, provided with hooks 18, by means of which the beams may be hung up to pivoted bails 19 on the upper part of the main frame, in the manner illustrated by dotted lines in Fig. 2, to hold the plows out of the ground when the implement is to be turned at the end of a row, or conveyed from place to place. In order to move the plows laterally while in use, to throw them near enough to the rows without injury to the growing plants, I employ stirrups 20, connected by suspenders 21 to the near ends of the horizontal arms of bell-crank levers 22, which are fulcrumed at or near their angles to the main frame at 23. The vertical arms of these bell-crank levers project obliquely forward, and are connected at their lower extremities to the ends of a transverse bar, 24, the central part of which is screw-threaded to a sufficient distance to receive the nuts 25 26, and adjust the plow-beams as to their distance asunder by means of said nuts acting upon L-shaped bars 27, which are constructed with eyes 29 30, fitted to slide upon the transverse bar 24. The eyes 29, at the inner extremities of the horizontal portions of the bars 27, are held between the respective pairs of nuts 25 26; but in order to prevent the contact of the said eyes with the screw-thread upon the rod 24, the latter is provided with sleeves 28, which receive the aforesaid eyes 29, as illustrated on a larger scale in Fig. 5, and against the ends of which sleeves the nuts 25 26 bear. The vertical members of the L-shaped bars 27 project downward through loops 31, attached to the sides of the beams, so as to permit a free vertical play of the beams, while the L-shaped bars 27 control their position laterally and as to their distance asunder.

From the above description it will appear that, in order to adjust the plows to a greater distance apart, the respective pairs of nuts 25 26 are simply moved outward upon the transverse bar 24, or they are moved inward to bring the plows nearer together. The movement of the plows while in use, to throw them closer to either side of the row, or to follow the sinuosities of the row, is imparted by the stirrups 20, as already described, acting through the medium of the bell-crank levers 22, transverse bar 24, and L-shaped bars 27.

The following is claimed as new:

1. The combination of the pivoted oblique braces 12, pendants 6, main frame 1, beams 7, and single-trees 11, substantially as and for the purposes set forth.

2. The L-shaped bars 27, constructed and operating as described, in combination with the plow-beams 7, loops 31, transverse bar 24, and nuts 25 26, substantially as and for the purposes set forth.

3. The nuts 25 26 and screw-protecting sleeves 28, in combination with the L-shaped bars 27 and transverse bar 24, for adjusting the plow-beams as to their distance asunder.

4. The combination of the hooks 18 and pivoted bails 19 with the pivoted handles 17, beams 7, and draft apparatus 6 13, by means of which the plow-beams are supported while out of use, without affecting the application of the draft to the main frame.

ROZANDER S. HIGGINS.

Witnesses:
   JAS. L. EWIN,
   WALTER ALLEN.